United States Patent
Leupold

(10) Patent No.: US 6,574,248 B1
(45) Date of Patent: Jun. 3, 2003

(54) LAMINATED WIGGLERS

(75) Inventor: Herbert A. Leupold, Eatontown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/447,060

(22) Filed: Nov. 22, 1999

(51) Int. Cl.[7] .................................................. H01S 3/00
(52) U.S. Cl. ............................ 372/2; 315/3; 315/3.5; 315/4; 315/5
(58) Field of Search ..................... 372/2; 250/396 ML; 335/302–306; 315/3, 3.5, 4, 5, 535

(56) References Cited

U.S. PATENT DOCUMENTS

| | | | | | |
|---|---|---|---|---|---|
| 4,442,522 | A | * | 4/1984 | Breau et al. .................... 372/2 |
| 4,530,096 | A | * | 7/1985 | Bekefi et al. ................... 372/2 |
| 4,542,510 | A | * | 9/1985 | Black, Jr. ....................... 372/2 |
| 4,697,272 | A | * | 9/1987 | Harvey ........................... 372/2 |
| 4,829,276 | A | * | 5/1989 | Leupold ...................... 335/306 |
| 5,319,339 | A | * | 6/1994 | Leupold ...................... 335/306 |
| 5,375,130 | A | * | 12/1994 | Shih .............................. 372/2 |
| 5,563,568 | A | * | 10/1996 | Sasaki ........................ 335/306 |
| 5,811,943 | A | * | 9/1998 | Mishin et al. ............... 315/505 |
| 2002/0044579 | A1 | * | 4/2002 | Kobayishi et al. ............. 372/2 |

* cited by examiner

*Primary Examiner*—Leon Scott, Jr.
(74) *Attorney, Agent, or Firm*—Michael Zelenka; George B. Tereschuk

(57) ABSTRACT

A wiggler that, when used in a free electron laser, reduces the harmonicity of the light emitted from the free electron laser. In general, the reduced harmonicity is accomplished by making the magnetic field distribution of the wiggler to be sinusoidal, rather than like a square wave. The sinusoidal magnetic field distribution reduces the number of harmonics that can be used to approximate the magnetic field distribution of the wiggler, and thus reduces the harmonicity of the light produced by passing an electron beam through the wiggler. In a particular embodiment, the wiggler is composed of pieces or segments of permanent magnets that are arranged along an axis such that their magnetic orientations are perpendicular to the axis, and such that the magnetic field distribution along the axis is sinusoidal.

15 Claims, 2 Drawing Sheets

LAMINATED WIGGLERS

GOVERNMENT INTEREST

The invention described herein may be manufactured, used, and licensed by or for the Government for governmental purposes without the payment to me of any royalty thereon.

FIELD OF THE INVENTION

The present invention relates to the field of permanent magnet structures and, more particularly, to the use of permanent magnet structures in electronic devices such as electromagnetic radiation sources.

BACKGROUND OF THE INVENTION

One type of electromagnetic radiation source that uses permanent magnets is a free electron laser. A free electron laser is a device that passes an electron beam through a periodic magnetic field to produce so-called coherent light. Coherent light results when the strength and periodicity of the field is such that the electrons in different parts of the beam radiate coherently.

One type of structure that has been used to supply the field required to generate coherent light is a so-called wiggler. A wiggler is typically composed of pieces or segments of permanent magnets that are arranged along an axis so that their magnetic orientations are perpendicular to the axis and such that immediately adjacent permanent magnet segments have magnetic orientations that are opposite in direction to each other. Such a composition enables the wiggler to generate a periodically alternating magnetic field that is transverse to the axis of the wiggler. Accordingly, an electron passing along the axis of the wiggler is subject to a repetitive motion (i.e. the alternating magnetic fields). The repetitive motion of the electron, or acceleration of an electric charge, causes the electron to radiate with the frequency of the period of the alternating magnetic fields in the wiggler. By proper adjustment of the strength and period of the wiggler's alternating fields, the electrons can be made to radiate such that they lase, and thus produce coherent light.

The light emitted from a free electron laser using such a wiggler, however, may contain many unwanted harmonics. The harmonics are due to the physical characteristics of the magnetic field that the wiggler produces. Specifically, the harmonics are due to the abrupt reversal of the magnetic field, from permanent magnet segment to permanent magnet segment, along the axis of the wiggler. The abrupt reversal from permanent magnet segment to permanent magnet segment causes the magnetic field to have a square wave distribution along the axis of the wiggler. Since such a square wave can be approximated by a sum of harmonics, the square wave distribution of the magnetic field along the axis of the wiggler causes the light emitted from the free electron laser to contain some harmonicity.

Free electron lasers that provide such harmonicity in the emitted light are not desirable in applications that require the free electron laser to output substantially monotonic light.

SUMMARY OF THE INVENTION

The present invention is a wiggler that, when used in a free electron laser, reduces the harmonicity of the light emitted from the free electron laser. In general, the reduced harmonicity is accomplished by making the magnetic field distribution of the wiggler to be sinusoidal, rather than square wave. A sinusoidal magnetic field distribution reduces the number of harmonics that must be used to approximate the magnetic field distribution of the wiggler, and thus reduces the harmonicity of the light produced by passing an electron beam through the wiggler. In particular embodiments, the wiggler is composed of pieces or segments of permanent magnets that are arranged along an axis such that their magnetic orientations are perpendicular to the axis, and such that the magnetic field distribution along the axis is sinusoidal.

These and other features of the invention will become more apparent from the Detailed Description when taken with the drawing. The scope of the invention, however, is limited only by the claims.

BRIEF DESCRIPTION OF THE DRAWINGS

FIG. 3b is a graphical view of the magnetization distribution of the wiggler shown in FIG. 3a.

DETAILED DESCRIPTION

Figure 1:
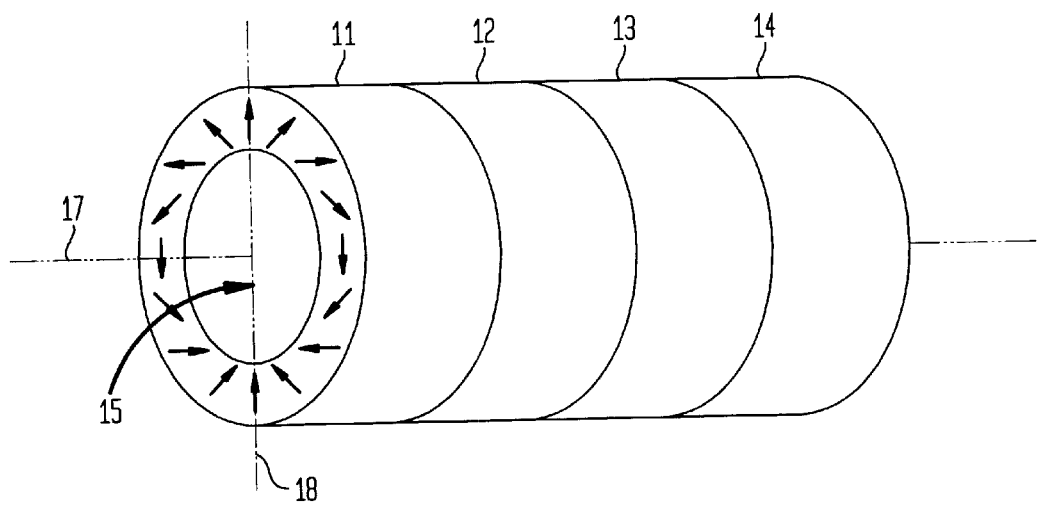
FIG. 1 is a perspective view of a conventional wiggler.

Referring now to FIG. 1, there is shown an illustrative embodiment of a conventional wiggler 10. As shown, conventional wiggler 10 is composed of permanent magnet segments 11–14 arranged such that they form a cylindrical cavity 15 along an axis 17. Permanent magnet segments 11–14 are magnetized such that they produce, in cavity 15, an alternating magnetic field along axis 17. The direction and magnitude of the magnetic field at any point along axis 17 depends on the direction and strength of the magnetization of the permanent magnetic segment located at that point. Thus, the profile of the wiggler's magnetic field along axis 17, i.e. the magnetic field distribution along axis 17, depends on the magnetization distribution of permanent magnet segments 11–14.

Figure 2A:
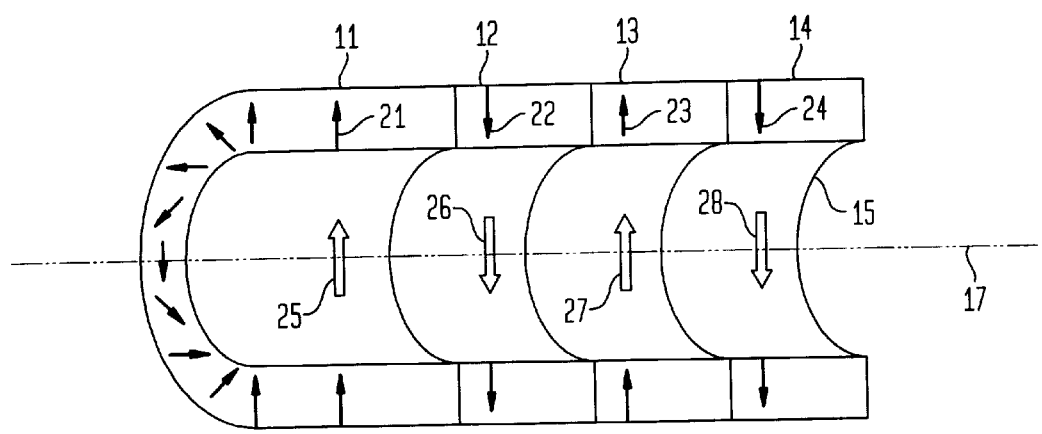
FIG. 2a is a cross-sectional view of the conventional wiggler shown in FIG. 1.

A cross-sectional view of conventional wiggler 10 is shown in FIG. 2a. The cross-sectional view is obtained by bisecting wiggler 10 along axis 18. As shown, conventional wiggler 10 is composed of permanent magnet segments 11–14 having a magnetic orientation or magnetization along axis 17 indicated by the thin arrows 21–24, respectively. The length of thin arrow 21 indicates the magnetization magnitude of its respective permanent magnet segment 11 relative to the magnetization magnitude indicated by the length of thin arrows 22–24 for their respective permanent magnet segments 12–14. The direction of thin arrow 21 indicates the magnetization direction of its respective permanent magnet segment 11 relative to the magnetization direction indicated by the direction of thin arrows 22–24 for their respective permanent magnet segments 12–14. Due to the magnetization of permanent magnet segments 11–14, conventional wiggler 10 generates a magnetic field having a distribution indicated by thick arrows 25–28. The length and direction of thick arrows 25–28 indicate the direction and magnitude, respectively, of the magnetic field distribution in cavity 15.

Figure 2B:
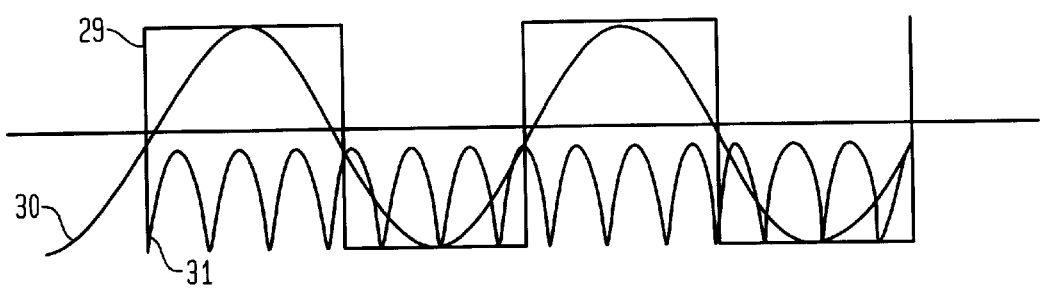
FIG. 2b is a graphical view of the magnetization distribution of the conventional wiggler shown in FIG. 1.

A graphical view of the magnetic field distribution of conventional wiggler 10 is shown in FIG. 2b. As shown, conventional wiggler 30 has a square wave magnetic field distribution 29 having a fundamental component 30 and harmonics 31. As stated above, such harmonics 31 can prevent the emission of monotonic light from conventional wiggler 30, and thus cause conventional wiggler 30 to be undesirable for use in applications requiring such monotonic light emissions.

In accordance with the principles of the present invention, however, making the magnetization distribution of the wiggler more sinusoidal than square wave can reduce the presence of such unwanted harmonics in the magnetic field distribution of a wiggler's cavity. The present inventor has found that such a sinusoidal magnetic field distribution can be obtained by making the magnetization distribution of the wiggler's permanent magnet segments more sinusoidal than square wave.

Figure 3A:
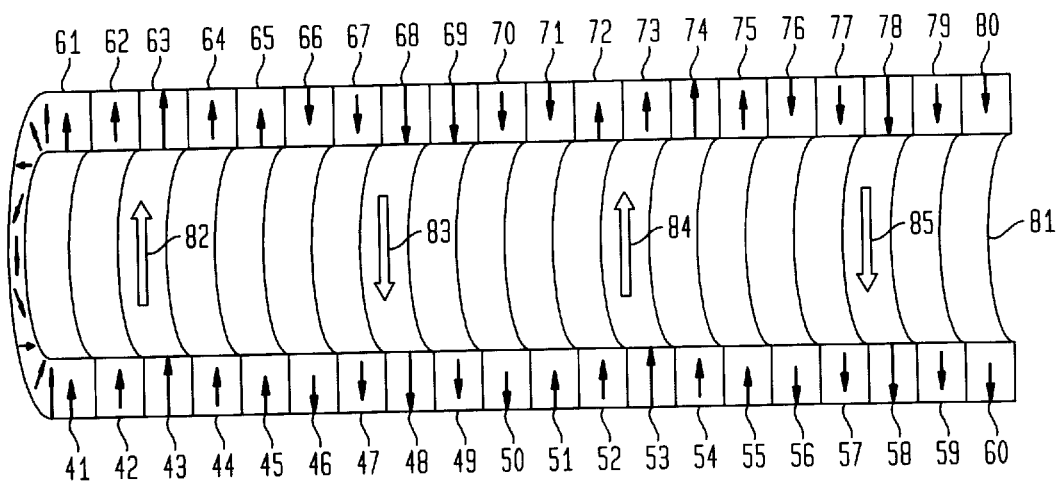
FIG. 3a is a cross-sectional view of an illustrative embodiment of a wiggler having a sinusoidal magnetization distribution in accordance with the principles of the present invention.

Referring now to FIG. 3a, there is shown a cross-section view of a wiggler 40 having such a sinusoidal magnetization distribution in accordance with the principles of the present invention. As shown, wiggler 40 is composed of permanent magnet segments 41–60. The relative magnetization of permanent magnet segments 41–60 are indicated by the relative length (magnitude) and direction of thin arrows 61–80, respectively. Such a distribution of magnetizations generates a magnetic field, in cavity 81, having a relative direction and magnitude indicated by thick arrows 82–85. Since making a sinusoidal magnetization distribution in accordance with the principles of the present invention requires the relative magnitude and direction of each permanent magnet segment to vary sinusoidally along an axis, it is not necessary to define the actual magnetization strength of wiggler 40. The actual strength or magnitude of permanent magnet segments 41–60 can be adjusted as required by a given application to obtain a given magnetic field in cavity 81.

Figure 3B:
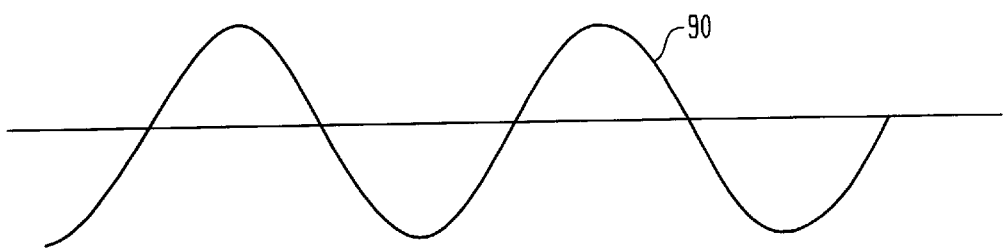

Referring now to FIG. 3b, there is shown a graphical view of magnetization distribution 90 of wiggler 40. As shown, the magnetization distribution 90 of wiggler 40 is sinusoidal in accordance with the principles of the present invention. As stated above, such a sinusoidal magnetization distribution causes the distribution of the magnetic field in the wiggler's cavity to be similarly sinusoidal. The present inventor has found that such a sinusoidal magnetic field distribution in the cavity reduces the harmonics present during the acceleration of an electron beam passing through the cavity. As a result, the wiggler will accelerate the electron beam such that it generates monotonic light.

It should be noted that the inventor herein has also found that the closer the magnetic field distribution approximates a true sine wave, the more nearly monotonic will be the frequency of the light generated by an electron beam traveling within the cavity of the wiggler. In addition, the present inventor has found that the thinner the slices of the permanent magnet segments, the more closely the magnetic field distribution can be represented as a sine wave. Thus, it can be contemplated that one skilled in the art may strive to design a wiggler in accordance with the principles of the present invention to be composed of the thinnest possible permanent magnet segments, wherein the segments are assembled to approximate a magnetization distribution as close as possible.

It should be understood, however, that a wiggler in accordance with the principles of the present invention is not limited to producing a magnetic field distribution having any particular sinusoidal shape. The present invention contemplates any wiggler having a permanent magnet structure that produces a magnetic field that does not abruptly change direction from segment to segment, as in the prior art. Thus, the present invention includes any wiggler composed of permanent magnet segments arranged along an axis such that the magnetic orientation of each permanent magnet segment is substantially the same as the magnetic orientation of at least one immediately adjacent permanent magnet segment. Such a structure will not produce a magnetic field having abrupt changes along the axis, but rather produces a magnetic field distribution that is more sinusoidal than square wave. Wiggler 40, as shown in FIGS. 3a and b, has this property in accordance with the principles of the present invention.

To see this aspect of wiggler 40 we now refer back to FIGS. 3a and b. As shown, each of the permanent magnet segments 41–60 that comprise wiggler 40 are immediately adjacent to at least one other permanent magnet segment having substantially the same magnetic orientation. For example, permanent magnet segment 42 is immediately adjacent to permanent magnet segments 41 and 43. That is, the magnetic orientation (magnitude and direction) 62 of permanent magnet segment 42 is the substantially the same as the magnetic orientation 61 of permanent magnet segment 41.

There are many known processes for making permanent magnet segments 41–60. For example, one way of making permanent magnet segments 41–60 would be to assemble pieces or slices of permanent magnet material into a ring-shaped piece that produces the desired magnetic field in the center portion of the ring. Such a process is well known by those skilled in the art. Once the ring-shaped pieces are assembled for each permanent magnet segment 41–60, they can be stacked to form wiggler 40.

While the invention has been particularly shown and described with reference to wiggler 40 shown in FIGS. 3a and b, it will be recognized by those skilled in the art that modifications and changes may be made to the present invention without departing from the spirit and scope thereof For example, in particular embodiments, a wiggler in accordance with the principles of the present invention may be made of permanent magnet segments having any number of different shapes and sizes, as long as the distribution of the magnetic field it produces is sinusoidal in shape. As a result, the invention in its broader aspects is not limited to specific details shown and described herein. Various modifications may be made without departing from the spirit or scope of the general inventive concept as defined by the appended claims.

Also, it should be noted that the terms and expressions used herein are used as terms of description and not of limitation, and there is no intention, in the use of such terms and expressions, of excluding any equivalents of the features shown and described or any portions thereof.

What is claimed is:

1. A laminated wiggler, comprising:
   a plurality of permanent magnet lamina segments defining a cavity are stacked adjacent to one another along an axis such that they produce a periodically alternating magnetic field, having a sinusoidal field distribution along said axis, being transverse to said axis;
   a given one of the plurality of permanent magnet segments having a magnetic orientation the same as the magnetic orientation of at least one permanent magnet segment positioned immediately adjacent to said given one of the plurality of permanent magnet segments;
   an electron, passing along said axis, having a repetitive motion within said cavity caused by said sinusoidal field distribution, radiates with the frequency of a period of said periodically alternating magnetic field; and said sinusoidal field distribution reducing a plurality of harmonics generated by an abrupt magnetic field reversal from one of said plurality of permanent magnet segments to another of said plurality of permanent magnet segments, whereby said electron is accelerated and produces an enhanced coherent monotonic light emission.

2. The laminated wiggler, as recited in claim 1, further comprising said cavity being cylindrical and around said axis.

3. A laminated wiggler, comprising:

a plurality of permanent magnet lamina segments defining a cavity are stacked adjacent to one another along an axis such that they produce a periodically alternating magnetic field, having a sinusoidal field distribution along said axis being transverse to said axis;

the magnetization of the plurality of permanent magnet segments varies quasi-sinusoidally with progression along said axis;

an electron, passing along said axis, having a repetitive motion within said cavity caused by said sinusoidal field distribution, radiates with the frequency of a period of said periodically alternating magnetic field; and said sinusoidal field distribution reducing a plurality of harmonics generated by an abrupt magnetic field reversal from one of said plurality of permanent magnet segments to another of said plurality of permanent magnet segments, whereby said electron is accelerated and produces an enhanced coherent monotonic light emission.

4. The laminated wiggler, as recited in claim 3, further comprising a given one of the plurality of permanent magnet segments having a magnetic orientation the same as the magnetic orientation of at least one permanent magnet segment positioned immediately adjacent to said given one of the plurality of permanent magnet segments.

5. The laminated wiggler, as recited in claim 3, further comprising said cavity being cylindrical and around said axis.

6. A free electron laser, comprising:

a laminated wiggler, said laminated wiggler being composed of a plurality of permanent magnet lamina segments defining a cavity and being stacked adjacent to one another along an axis such that the plurality of permanent magnet segments produces a periodically alternating magnetic field, having a substantially sinusoidal field distribution along said axis, being transverse to said axis;

a given one of the plurality of permanent magnet segments having a magnetic orientation the same as the magnetic orientation of at least one permanent magnet segment positioned immediately adjacent to said given one of the plurality of permanent magnet segments;

an electron, passing along said axis, having a repetitive motion within said cavity caused by said substantially sinusoidal field distribution, radiates with the frequency of a period of said periodically alternating magnetic field; and said substantially sinusoidal field distribution reducing a plurality of harmonics generated by an abrupt magnetic field reversal from one of said plurality of permanent magnet segments to another of said plurality of permanent magnet segments, whereby said electron is accelerated and produces an enhanced coherent monotonic light emission.

7. The free electron laser, as recited in claim 6, further comprising said cavity being cylindrical and around said axis.

8. A free electron laser, comprising:

a laminated wiggler, said laminated wiggler being composed of a plurality of permanent magnet lamina segments defining a cavity and being stacked adjacent to one another along an axis such that the plurality of permanent magnet segments produces a periodically alternating magnetic field, having a substantially sinusoidal field distribution along said axis, being transverse to said axis;

the magnetization of each of the plurality of permanent magnet segments positioned immediately adjacent to one another vary quasi-sinusoidally with progression along said axis;

an electron, passing along said axis, having a repetitive motion within said cavity caused by said substantially sinusoidal field distribution, radiates with the frequency of a period of said periodically alternating magnetic field; and said substantially sinusoidal field distribution reducing a plurality of harmonics generated by an abrupt magnetic field reversal from one of said plurality of permanent magnet segments to another of said plurality of permanent magnet segments, whereby said electron is accelerated and produces an enhanced coherent monotonic light emission.

9. The free electron laser, as recited in claim 8, further comprising a given one of the plurality of permanent magnet segments of said laminated wiggler having a magnetic orientation the same as the magnetic orientation of at least one permanent magnet segment positioned immediately adjacent to said given one of the plurality of permanent magnet segments.

10. The free electron laser, as recited in claim 8, further comprising said cavity being cylindrical and around said axis.

11. A permanent laminated magnet structure for use as a wiggler, said permanent magnet structure, comprising:

a plurality of permanent magnet lamina segments defining a cavity are stacked adjacent to one another to form a periodically alternating magnetic field along an axis, said permanent magnet segments being magnetized such that each permanent magnet segment is adjacent to at least one other permanent magnet segment having substantially the same magnetization direction;

an electron, passing along said axis, having a repetitive motion within said cavity caused by a substantially sinusoidal field distribution, radiates with the frequency of a period of said periodically alternating magnetic field; and said substantially sinusoidal field distribution reducing a plurality of harmonics generated by an abrupt magnetic field reversal from one of said plurality of permanent magnet segments to another of said plurality of permanent magnet segments, whereby said electron is accelerated and produces an enhanced coherent monotonic light emission.

12. The permanent laminated magnet structure of claim 11, wherein said periodically alternating magnetic field produced by said plurality of permanent magnet segments has a substantially sinusoidal distribution along said axis.

13. A method for radiating substantially monotonic light, the method comprising the steps of:

passing an electron beam through a permanent magnet structure, said permanent magnet structure being composed of a plurality of permanent magnet lamina segments defining a cavity and being stacked adjacent to one another along an axis such that the plurality of permanent magnet segments produces a periodically alternating magnetic field, having a substantially sinusoidal field distribution along said axis, being transverse to said axis;

providing a given one of the plurality of permanent magnet segments having a magnetic orientation the same as the magnetic orientation of at least another one of the plurality of permanent magnet segments positioned immediately adjacent to said given one of the plurality of permanent magnet segments;

radiating an electron from said electron beam, with the frequency of a period of said periodically alternating magnetic field, said electron having a repetitive motion within said cavity caused by said substantially sinusoidal field distribution;

reducing a plurality of harmonics generated by an abrupt magnetic field reversal from one of said plurality of permanent magnet segments to another of said plurality of permanent magnet segments; and accelerating said electron to produce an enhanced coherent monotonic light emission due to said substantially sinusoidal field distribution.

14. The method for radiating substantially monotonic light, as recited in claim 13, further comprising the step of forming said cavity in a cylindrical shape.

15. A laminated wiggler, comprising:

a plurality of permanent magnet lamina segments are stacked adjacent to one another along an axis such that they form a cavity, said permanent magnet segments being magnetized such that they generate a periodically alternating magnetic field in said cavity transverse to said axis;

each of said plurality of permanent magnet segments having a relative magnitude and direction that varies sinusoidally along said axis and a magnetic orientation substantially the same as the magnetic orientation of at least one other of the plurality of permanent magnetic segments;

said periodically alternating magnetic field having a sinusoidal field distribution along said axis;

said sinusoidal field distribution being operable to subject an electron traveling along said axis to a repetitive motion within said cavity thereby causing the electron to radiate with a frequency of the period of the repetitive motion; and said sinusoidal field distribution reducing a plurality of harmonics generated by an abrupt magnetic field reversal from one of said plurality of permanent magnet segments to another of said plurality of permanent magnet segments, whereby said electron is accelerated and produces an enhanced coherent monotonic light emission.

\* \* \* \* \*